United States Patent Office 2,980,519
Patented Apr. 18, 1961

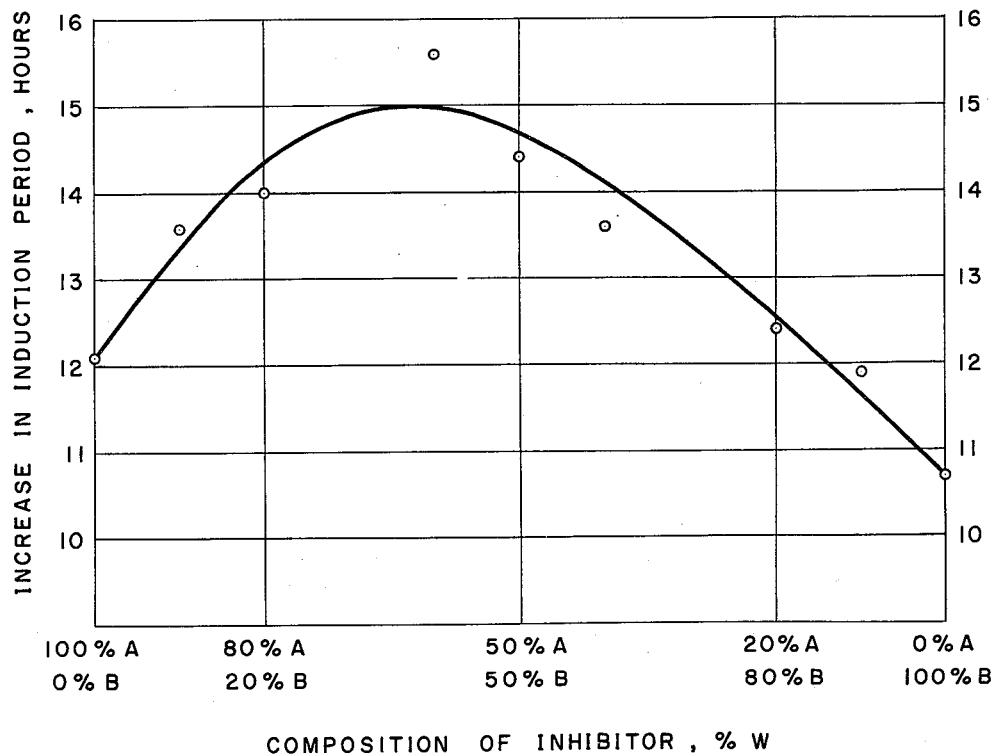

2,980,519

GASOLINE FUEL COMPOSITIONS

Alan C. Nixon, Berkeley, and Harry B. Minor, Orinda, Calif., assignors to Shell Oil Company, a corporation of Delaware Filed Dec. 16, 1955, Ser. No. 553,629

6 Claims. (Cl. 44—69)

This invention relates to organic compositions stabilized against oxidative deterioration.

The compound 2,6-ditertiarybutyl-4-methylphenol is used extensively to inhibit the oxidative deterioration of various organic substances, particularly oils, fats, waxes and the like, which are normally subject to oxidative deterioration. About 5 to 5½ million pounds of this material is sold on the open market each year in the United States, essentially all being used for the antioxidant purpose.

While this compound is effective for this purpose, it is relatively expensive because it is manufactured by the alkylation of para-cresol, which is itself a relatively expensive alkylphenol. It is especially desirable to use as small a concentration of the inhibitor as is possible to achieve the desired oxidation inhibition of the organc material for economic reasons and also to minimize the possibility of undesirable side effects. It is also desirable, of course, to achieve as high a resistance to oxidation as possible at any given concentration of inhibitor.

It is an object of the present invention to provide improved organic compositions, containing an especially effective oxidation inhibitor. Another object is to provide such compositions satisfactorily inhibited against oxidative decomposition with a particularly small concentration of an oxidation inhibitor. Another object of the invention is to increase the effectiveness of 2,6-ditertiarybutyl-4-methylphenol as an oxidation inhibitor for organic substances. Other objects of the invention will be apparent from the description of the invention.

It has now been discovered that mixtures of 2,6-ditertiary-butyl-4-methylphenol and 2-tertiarybutyl-4-methylphenol exhibit synergistic interaction in the inhibition of oxidative deterioration of organic material, the combination being more effective for this purpose than either compound alone, the maximum effectiveness being between about 50 and 70%, and usually about 60%, by weight of 2,6-ditertiarybutyl-4-methylphenol. This effect is illustrated in the drawing in which the single figure is a graph of the oxidation-inhibiting effectiveness of mixtures of 2,6-ditertiarybutyl-4-methylphenol and 2-tertiarybutyl-4-methylphenol, these compounds being represented in the drawing as "A" and "B," respectively.

The data of the drawing were obtained from tests conducted in the following manner:

The organic material used as a base was a typical commercial premium gasoline containing no added oxidation inhibitor and having the following composition and properties:

Composition:
    Butane _____percent vol__ 4.3
    Isopentane _____do____ 0.7
    80–340° F. straight run gasoline _____do____ 30.5
    $C_5$–250° F. thermal and cat. cracked gasoline _____percent vol__ 30.3
    250–430° F. hydrogenated cat. cracked gasoline _____percent vol__ 26.7
    Cat. reformed gasoline _____do____ 7.5
    Tetraethyl lead (motor mix)____cc./U.S. gal__ 2.74

Hydrocarbon Type Analysis:
    Saturates _____ percent vol__ 60
    Olefins _____do____ 19
    Aromatics _____do____ 21
Properties:
    Gravity _____ ° API__ 56.4
    Reid vapor pressure _____lbs__ 8.3
    ASTM distillation, ° F.:
        I.B.P. _____ 98
        10% evaporated _____ 134
        50% _____ 223
        90% _____ 379
        F.B.P. _____ 418
    Total sulfur _____ percent wt__ 0.15
    Research octane No. _____ 94.5

To this base gasoline was added 2,6-ditertiarybutyl-4-methylphenol and 2-tertiarybutyl-4-methylphenol individually and in mixtures of varying proportions, with the total concentration of these two compounds being held constant at 10 milligrams per 100 milliliters of gasoline. Induction periods of the resulting gasoline solutions were obtained under 100 p.s.i.g. oxygen pressure at 100° C., following the procedure prescribed in ASTM method No. D-525-49. The results are presented in Table I, as well as in the drawing, the compound 2,6-ditertiarybutyl-4-methylphenol being designated as "A," and the compound 2-tertiarybutyl-4-methylphenol being designated as "B":

Table 1

| Proportions of Inhibitor Mixture, Percent wt. | Induction Period, Hours | Increase in Induction Period Over Base, Hours |
|---|---|---|
| Base (No Inhibitor) | 0.9 | |
| 100A | 13.0 | 12.1 |
| 90A+10B | 14.5 | 13.6 |
| 80A+20B | 14.9 | 14.0 |
| 60A+40B | 16.5 | 15.6 |
| 50A+50B | 15.3 | 14.4 |
| 40A+60B | 14.5 | 13.6 |
| 20A+80B | 13.3 | 12.4 |
| 10A+90B | 12.8 | 11.9 |
| 100B | 11.6 | 10.7 |

The combination oxidation inhibitor of the invention may be used in many other organic substances as well as gasoline, especially hydrocarbon materials. It is particulary applicable also to jet fuel, heating and furnace oils, "specialty products" such as mineral spirits, cleaners' naptha, paint solvents, and the like, lubricating oils especially such as turbine and transformer oils, paraffin, microcrystalline and tank bottom waxes, polyethylene waxes, and residual oils such as bright stock, residual fuel oils and asphalts, as well as to rubber, food products and animal, vegetable and fish derived oils, fats and waxes. Particularly beneficial results are generally achieved in the case of liquid hydrocarbon products and especially hydrocarbon distillates.

The benefits of the combination inhibitor of the invention may be obtained over wide ranges of total concentration. The total concentration may be as low as 0.00005% by weight to as high as 1.5% by weight depending upon the particular material in which it is incorporated, the severity of the conditions to which the material is to be subjected, and the length of time the material must be protected against oxidative deterioration. For example, in gasoline, jet fuel and other hydrocarbon distillates, the lower concentrations are ordinarily sufficient, that is, up to about 0.15% by weight, and preferably from about 0.0001 to about 0.02% by weight. On the other hand, in transformer oils, turbine oils and other heavy hydrocarbon liquids and hydrocarbon solids, higher concentrations will often be advantageous, that is, above about 0.05% by weight and preferably from about 0.1 to 1.0% by weight.

The proportions of the two components of the combination inhibitor of the invention can be varied extensively, material benefits being obtained when the mixture contains substantial proportions of each. As can be seen from an inspection of the drawing, the mixture in all proportions exhibits the combination effect that the effectiveness is greater over the entire range than would be calculated by arithmetic proportion of the effectiveness of the individual components. However, it is preferred that at least about 15% by weight 2,6-ditertiarybutyl-4-methylphenol be present so that the effectiveness of the mixture is even greater than that of this component alone, and in general, it is also preferred that at least 5%, and more especially at least 10% by weight 2-tertiarybutyl-4-methylphenol be present; it is preferable that at least 20% and more especially at least 25% by weight 2,6-ditertiarybutyl-4-methylphenol be present in the mixture. Thus, with the preferred minimum of 15% by weight 2,6-ditertiarybutyl-4-methylphenol and the preferred minimum of 5% by weight 2-tertiarybutyl-4-methylphenol, the proportion range of the mixture is from 15 to 95% by weight 2,6-ditertiarybutyl-4-methylphenol and from 85 to 5% by weight 2-tertiarybutyl-4-methylphenol. Similarly, with the especially preferred minimum of 25% by weight 2,6-ditertiarybutyl-4-methyl and the especially preferred minimum of 10% by weight 2-tertiarybutyl-4-methylphenol, the proportion range of the mixture is from 25 to 90% by weight 2,6-ditertiarybutyl-4-methylphenol and from 75 to 10% by weight 2-tertiarybutyl-4-methylphenol.

We claim as our invention:

1. A gasoline fuel consisting essentially of gasoline and containing a small amount, sufficient to stabilize said fuel against oxidative deterioration, of a mixture consisting of from about 25% to about 75% by weight of 2,6-ditertiarybutyl-4-methylphenol and from about 75% to about 25% by weight of 2-tertiarybutyl-4-methylphenol.

2. A gasoline fuel consisting essentially of gasoline and containing a small amount, sufficient to stabilize said fuel against oxidative deterioration, of a mixture consisting of equal parts by weight of 2,6-ditertiarybutyl-4-methylphenol and 2-tertiarybutyl-4-methylphenol.

3. A gasoline fuel consisting essentially of gasoline containing tetraethyl lead and from about 0.00005 to about 1.5% by weight of an oxidation inhibitor consisting essentially of a mixture of from about 25 to about 90% by weight of 2,6-ditertiarybutyl-4-methylphenol and from about 75 to about 10% by weight of 2-tertiarybutyl-4-methylphenol.

4. A gasoline fuel consisting essentially of gasoline containing tetraethyl lead and from about 0.0001 to about 0.15% by weight of an oxidation inhibitor consisting essentially of from about 25 to about 90% by weight of 2,6-ditertiarybutyl-4-methylphenol and from about 75 to about 10% by weight of 2-tertiarybutyl-4-methylphenol.

5. A gasoline fuel consisting essentially of gasoline containing tetraethyl lead and from about 0.0001 to about 0.02% by weight of an oxidation inhibitor consisting essentially of a mixture of from about 25 to about 90% by weight of 2,6-ditertiarybutyl-4-methylphenol and from about 75 to about 10% by weight of 2-tertiarybutyl-4-methylphenol.

6. A gasoline fuel consisting essentially of gasoline containing tetraethyl lead and from about 0.0001 to about 0.02% by weight of an oxidation inhibitor consisting essentially of a mixture of 2,6-ditertiarybutyl-4-methylphenol and 2-tertiarybutyl-4-methylphenol, the concentration of 2,6-ditertiarybutyl-4-methylphenol in said mixture being from about 50 to 70% by weight.

References Cited in the file of this patent
UNITED STATES PATENTS

| | | |
|---|---|---|
| 2,202,877 | Stevens et al. | June 4, 1940 |
| 2,459,597 | Stillson et al. | Jan. 18, 1949 |
| 2,672,448 | Newman et al. | Mar. 16, 1954 |
| 2,721,804 | Rosenwald | Oct. 25, 1955 |

OTHER REFERENCES

Food Manufacture, October 1954, page 398.

"Alkyl Phenols as Antioxidants," by Rosenwald, Hoatson, and Chenicek, Ind. and Eng. Chem., January 1950, vol. 42, No. 1, pages 162–165.